ature of about 100° C. is generally required to effec-
United States Patent Office
3,188,357
Patented June 8, 1965

3,188,357
DEHYDROCHLORINATION OF 1,2,3-TRICHLOROBUTANE
John H. Blumbergs, Highland Park, N.J., assignor to Allied Chemical Corporation, New York, N.Y., a corporation of New York
No Drawing. Filed June 8, 1961, Ser. No. 115,611
2 Claims. (Cl. 260—655)

This invention relates to chloroprene manufacture (2-chlorobutadiene-1,3), and more particularly to a new and improved process for dehydrochlorinating 1,2,3-trichlorobutane to intermediates in the production of chloroprene.

Chloroprene is used in the production of many valuable products including a synthetic rubber which in many respects is superior to natural rubber. One route to chloroprene is by way of butene-2 which is chlorinated, usually with chlorine in successive stages, to yield a mixture of 2,2,3- and 1,2,3-trichlorobutane isomers which usually form in a ratio of about 2.2–2.8 mols, more generally about 2.6 mols of 2,2,3-trichlorobutane per mol of 1,2,3-trichlorobutane. These isomers are then separated, e.g. by distillation, and the 2,2,3-trichlorobutane isomer converted directly to chloroprene by pyrolysis, i.e. thermal dehydrochlorination. The 1,2,3-trichlorobutane isomer can not be so converted because on pyrolysis it forms 1-chlorobutadiene which constitutes a difficult to separate and highly undesirable impurity in the chloroprene. As large amounts of 1,2,3-trichlorobutane are produced it is therefore important that this material be used in the process.

An approach to the utilization of 1,2,3-trichlorobutane involves dehydrochlorination in a first stage to dichlorobutenes which can then be converted by a known method—second stage thermal dehydrochlorination—to chloroprene. A particular problem in this approach is that 1,2,3-trichlorobutane on dehydrochlorination may produce a number of possible dichlorobutene isomers some of which are convertible in the second stage to chloroprene and others which result in the undesirable 1-chlorobutadiene. Because this type of dehydrochlorination reaction is for the most part highly unpredictable the art has struggled with the problem of converting 1,2,3-trichlorobutane to only those dichlorobutene isomers which are convertible to chloroprene. Consequently, many workers in the field have attempted to utilize 1,2,3-trichlorobutane in the production of chloroprene without material success. As the commonly known dehydrochlorinating agents can be expected to produce all possible dichlorobutene isomers the prior art has expressly avoided these materials and taught the necessity of special conditions and treatment for selectively dehydrochlorinating 1,2,3-trichlorobutane. Recently, as disclosed in U.S. Patent 2,879,311, Hawkins succeeded in converting 1,2,3-trichlorobutane to a series of chloroprene convertible dichlorobutene isomers but found it necessary to employ a highly specific catalytic material, i.e., hydrochloride or quaternary ammonium chloride amine salts of specified pK value and boiling point. Further, despite the use of special and highly specific catalyst the products produced by this process are either low in yield or contain predominantly the 1,2-dichlorobutene-2 isomer which while chloroprene convertible is relatively stable and substantially non-convertible when subjected to pyrolytic conditions most satisfactorily employed for second stage conversion of dichlorobutene isomers to chloroprene. As a result, large amounts of 1,2-dichlorobutene-2 are subject to special treatment to convert this material by isomerization to the 2,3-dichlorobutene-1 isomer which readily converts on pyrolysis to chloroprene.

An object of the present invention is to provide an efficient and economical process for selectively converting 1,2,3-trichlorobutane into only those dichlorobutene isomers which can be utilized as precursors for chloroprene.

Another object is to provide a process which will convert 1,2,3-trichlorobutane into high yields, in excess of 95 percent, generally in excess of 98 percent, of dichlorobutene isomers directly utilizable in the production of chloroprene.

A further object is to provide a process for converting 1,2,3-trichlorobutane into dichlorobutene products containing predominantly the 2,3-dichlorobutene-1 isomer which easily and readily converts on pyrolytic treatment to chloroprene.

A still further object is to provide a process for conversion of 1,2,3-trichlorobutane in which chloroprene convertible dichlorobutene isomers are obtained in practically quantitative yield and with little or no polymeric by-product formation.

In accordance with the present invention I have discovered that 1,2,3-trichlorobutane may be selectively converted in almost quantitative yield to a product containing substantially only chloroprene convertible dichlorobutenes and containing predominantly the readily chloroprene convertible 2,3-dichlorobutene-1 isomer by admixing 1,2,3-trichlorobutane with a stoichiometric amount, preferably a stoichiometric excess up to about 35 or more percent, of sodium hydroxide, heating the mixture at a temperature within the range of about 100° C. to 250° C., preferably 150° C. to 180° C., and recovering the product dichlorobutenes. Yields are practically quantitative and very little or no polymeric material is formed. The only by-products of the reaction are metal chloride and water. Although no explanation can be reliably offered for the result the product dichlorobutenes contain predominantly the readily chloroprene convertible 2,3-dichlorobutene-1 isomer with substantially less amounts of refractory 1,2-dichlorobutene-2 isomer. In fact, for similar high yields the process of this invention appears to reverse the proportionate yields of these isomers as obtained from the amine process, with the production of at least about 40–50 percent of 2,3-dichlorobutene-1 and only about 20–30 percent 1,2-dichlorobutene-2 compared with a high 45–50 percent of the less desirable 1,2-dichlorobutene-2 and about 20–30 percent of 2,3-dichlorobutene-1 by the amine process.

In practicing the invention 1,2,3-trichlorobutane is admixed in a suitable reactor with sodium hydroxide and heated for sufficient time to complete the reaction. Generally, about 3 to 4 hours is adequate. In the preferred form of practice the reaction is carried out under reflux with the product dichlorobutenes being recovered by fractional distillation from the reaction mixture, suitable apparatus for this purpose including a still on which is superimposed a fractionating column such as a packed column. Reaction conditions are preferably such that the reaction zone is substantially free of oxygen which tends to cause tar-formation. This may be accomplished in any known manner, preferably by conducting the reaction in an atmosphere of nitrogen. The reaction rate is increased at higher temperatures. Best results are obtained at a reaction temperature of about 150° C. to 180° C. The development of tar-formation becomes a problem at high temperatures such that reaction above about 250° C. is not considered practical. Operation above a lower limit temtively complete the reaction. Superatmospheric and subatmospheric pressure may be employed but the reaction may be conveniently carried out under substantially atmospheric pressure.

Although high purity 1,2,3-trichlorobutane starting material is desirable it is not particularly important. The 1,2,3-trichlorobutane obtained from the distillation separation from 2,2,3-trichlorobutane in the chloroprene process may be used directly without purification in this process. The presence of at least minor amounts of tetrachlorobutanes and 2,2,3-trichlorobutane which are most likely to be encountered in the chloroprene process at this point can be tolerated without negative effect. Although these impurities do not interfere with the dehydrochlorination reaction it will be noted that 2,2,3-trichlorobutane undergoes conversion on dehydrochlorination to 2,3-dichlorobutene-2 which is not chloroprene convertible and consequently it will of course be desirable to remove as much as possible of this material from 1,2,3-trichlorobutane during the separation step. Similarly, 2,2,3,3-tetrachlorobutane although a solid at 180° C. tends to sublime which may result in clogging of the column during extended continuous operation.

The sodium hydroxide reacts with the 1,2,3-trichlorobutane to remove one mol of HCl which combines with the basic material to form by-product sodium chloride and water. Consequently, complete dehydrochlorination of one mol of 1,2,3-trichlorobutane requires a stoichiometric amount of basic material. In carrying out the process it has been found beneficial to use a moderate excess of basic material, preferably 1.05 to 1.35 or more mols of dehydrochlorinating agent per mol of 1,2,3-trichlorobutane. A large excess of basic material offers no further advantages and concentrations below an upper limit of about 1.5 mols per mol of 1,2,3-trichlorobutane are usually maintained in economical operation. As used herein and the appended claims the term "hydroxide" shall be taken to also include the oxides of sodium and potassium. The basic material may be employed in aqueous solution but this procedure offers no particular benefit and the anhydrous material is generally preferred.

The process of the present invention may be carried out batchwise or continuously. In continuous operation make-up consisting of 1,2,3-trichlorobutane and sodium hydroxide in pre-selected proportions will be continuously added to the reaction mixture in sufficient amount to maintain a desired level and portion of reactants in the reactor. The product dichlorobutenes and by-product water are continuously withdrawn from the upper portion of the fractionating column. As by-product sodium chloride solution remains in the reactor build up of this material may be prevented by withdrawing a portion of the reaction mixture from a low portion of the reactor and treating by a suitable method e.g. filtration, thereby removing the sodium chloride and returning the treated material to the reactor.

Of the sixteen possible dichlorobutene isomers obtainable on dehydrochlorination from 1,2,3-trichlorobutane the product of this invention consists almost entirely of a mixture of only four such isomers in which the predominant component is the 2,3-dichlorobutene isomer constituting approximately 50 percent of the mixture. All four of these dichlorobutene isomers are of the type which convert directly to chloroprene rather than to the highly undesirable 1-chlorobutadiene. This is most satisfactorily accomplished by subjecting the dichlorobutene product mixture to non-catalytic thermal dehydrochlorination usually at temperatures of 450° C. to 650° C., preferably at 500° C. to 600° C., as typically illustrated in Example 3, below. An advantageous procedure is to combine the 2,2,3-trichlorobutane previously produced in the chloroprene process and separated from the 1,2,3-trichlorobutane with the dichlorobutene product mixture and the resulting mixture subjected to pyrolysis. This procedure has been found to result in improved pyrolytic conversion to chloroprene over the results obtained when either the dichlorobutene product mixture or 2,2,3-trichlorobutane is separately pyrolyzed under the same conditions. Such mixtures containing 40 to 85 percent 2,2,3-trichlorobutane may be employed in the non-catalytic thermal dehydrochlorination procedure to give improved chloroprene conversions. In either case, the resulting product is a mixture containing sought for chloroprene together with unreacted amounts of the dichlorobutenes. After separation of the chloroprene the unreacted dichlorobutenes may be recycled for further conversion. As shown by Example 3, below, a major portion of the individual dichlorobutene products are pyrolyzed to chloroprene with the exception of the 1,2-dichlorobutene-2 isomer of which only a small percentage is converted due to its refractory nature. The 1,2-dichlorobutene-2 may be converted by known procedures, usually by heating under reflux in the presence of copper or copper chloride catalyst to isomerize the 1,2-dichlorobutene-2 to the readily convertible 2,3-dichlorobutene-1 isomer which may then be admixed with other dichlorobutenes for pyrolysis to chloroprene. As the product of the present invention includes substantially greater amounts of the readily convertible 2,3-dichlorobutene-1 isomer and much less amounts of 1,2-dichlorobutene-2 than the amine process, it will be evident that important features of this invention result in higher yields of chloroprene per pass on pyrolysis of the dichlorobutene product and the presence of substantially less material requiring special treatment.

The following examples illustrate the practice and advantages of the present invention.

*Example 1*

The reactor employed was a round bottom flask equipped with a thermometer and a superimposed 3 foot distillation column packed with Raschig rings. The upper portion of the column was fitted with a thermometer and discharge outlet leading to a condenser for cooling and collecting the distillate. The reactor was charged with 1,2,3-trichlorobutane starting material having a purity of about 97.5 mol percent and containing minor amounts of 2,2,3-trichlorobutane (1.2 mol percent), 2,2,3,3-tetrachlorobutane (0.1 mol percent), 1,2,3,3-tetrachlorobutane (0.8 mol percent), and 1,2,2,3-tetrachlorobutane (0.4 mol percent). To this material was added caustic soda flake in the mol ratio of about 1.0 mol of 1,2,3-trichlorobutane starting material to 1.25 mols of caustic soda. Air was then vented from the reaction system and replaced by an atmosphere of nitrogen. The reaction mixture was then heated and maintained during the reaction at a temperature of about 150°–160° C. Organic product was fractionally distilled from the reaction mixture and recovered from the top of the column. The product on analysis by gas chromatography contained, 49.3 mol percent of material identified as 2,3-dichlorobutene-1, B.P. 110°–111° C.; 2.0 mol percent of material identified as 3,4-dichlorobutene-1, B.P. 115° C.; 29.3 mol percent of material identified as 1,2-dichlorobutene-2, B.P. 130°–131° C.; 17.4 mol percent of material identified as 1,3-dichlorobutene-2, B.P. 127°–129° C.; 0.6 mol percent 1,2,3-trichlorobutane, B.P. 160°–165° C. and 1.4 mol percent of lower and higher boiling materials in which 1-chlorobutadiene was present in small amount below 0.1 mol percent based on total amount of organic product. Conversion of 1,2,3-trichlorobutane was 99.4 percent. Yield of dichlorobutenes based on the 1,2,3-trichlorobutane converted was 99.7 percent.

*Example 2*

Apparatus and procedure employed were the same as in Example 1. The reactor was charged with 50 grams of 1,2,3-trichlorobutane starting material having a purity of about 83.7 mol percent and containing minor amounts of 2,2,3-trichlorobutane (1.7 mol percent), 1,2,3,3-tetrachlorobutane (6.1 mol percent), 1,2,2,3-tetrachlorobutane (7.9 mol percent), and 0.6 mol percent other chlorobutanes. To this material was added 15.5 grams of caustic soda flake. The mol ratio of 1,2,3-trichlorobutane starting material to caustic soda was about 1.0 to 1.25. Air was then vented from the reaction system and replaced by an atmosphere of nitrogen. The reaction mixture was then heated and maintained during the reaction at a temperature of about 150°–160° C. Organic product was fractionally distilled from the reaction mixture and recovered from the top of the column. The product on analysis by gas chromatography contained 54.8 mol percent of material identified as 2,3-dichlorobutene-1, B.P. 110°–111° C.; 1.5 mol percent of material identified as 3,4-dichlorobutene-1, B.P. 115° C.; 24.5 mol percent of material identified as 1,2-dichlorobutene-2, B.P. 130°–131° C.; 17.1 mol percent of material identified as 1,3-dichlorobutene-2, B.P. 127°–129° C.; 1.1 mol percent 1,2,3-trichlorobutane, B.P. 160°–165° C.; and 1.0 mol percent of lower and higher boiling materials in which 1-chlorobutadiene was present in trace amounts well below 0.1 mol percent based on total amount of materials recovered. Conversion of 1,2,3-trichlorobutane was 98.9 percent. Yield of dichlorobutenes based on the 1,2,3-trichlorobutane converted was about 99.5 percent.

*Example 3*

This example illustrates the thermal dehydrochlorination of dichlorobutenes derived from 1,2,3-trichlorobutane by the process of the present invention. The reactor employed was an unpacked tube 9 mm. I.D. x 19 inches fitted with 6 mm. thermowell and heated by a resistance wire wound directly on the tube. Throughout the run the reactor was heated to about 575° C. There was passed into the reactor a vaporous mixture obtained by combining the products from previous caustic soda dehydrochlorination runs and comprising 50.0 mol percent 2,3-dichlorobutene-1, 1.8 mol percent 3,4-dichlorobutene-1, 33.8 mol percent 1,2-dichlorobutene-2, 13.8 mol percent 1,3-dichlorobutene-2 and 0.6 mol percent higher and lower boiling 1,2,3-trichlorobutane conversion products. Retention time in the reactor was about 3.0 seconds. Products exiting the reactor were passed to a condenser and there was recovered a mixture which on analysis by gas chromatography showed 43.6 mol percent chloroprene, B.P. 59.4° C.; 16.3 mol percent 2,3-dichlorobutene-1; 0.4 mol percent 3,4-dichlorobutene-1; 32.5 mol percent 1,2-dichlorobutene-2; 2.1 mol percent 1,3-dichlorobutene-2; and 5.1 mol percent of other conversion products including only a minor amount of 1-chlorobutadiene. Only 3.9 percent of the 1,2-dichlorobutene-2 in the feed composition was converted to chloroprene while 67.4 percent of the 2,3-dichlorobutene-1 charged underwent conversion to chloroprene.

*Example 4*

For purposes of comparison dehydrochlorination of 1,2,3-trichlorobutane was carried out using the amine catalyst of U.S. Patent 2,879,311. Apparatus was the same as in Examples 1 and 2. The reactor was charged with 100 grams of 1,2,3-trichlorobutane starting material having a purity of about 96.0 mol percent and containing about 3.0 mol percent 2,2,3,3-tetrachlorobutane and about 1.0 mol percent other chlorobutanes. To this material was added 20 grams quinoline as catalyst. Air was vented from the reaction system and replaced by an atmosphere of nitrogen. The reaction mixture was then heated and maintained during the reaction at a temperature of 150° C. to 165° C. The fractionally distilled product was washed free of CHI and the organic product on analysis by gas chromatography showed 17.9 mol percent 2,3-dichlorobutene-1; 5.1 mol percent 3,4-dichlorobutene-1; 53.1 mol percent 1,2-dichlorobutene-2; 12.0 mol percent 1,3-dichlorobutene-2; 9.6 mol percent 1,2,3-trichlorobutane; and 2.7 mol percent of lower and higher boiling materials. Conversion of 1,2,3-trichlorobutane was 91.4 percent. Yield of dichlorobutenes based on 1,2,3-trichlorobutane converted was 98.0 percent. Yield of the readily convertible 2,3-dichlorobutene-1 was 19.8 percent compared to an average of about 52.5 percent or more and 2½ times as much from the caustic soda process of the present invention. Yield of the refractory 1,2-dichlorobutene-2 material was a high 58.8 percent compared to an average of about 27.1 percent or less than one half as much by the process of the present invention.

Although certain preferred embodiments of the invention have been disclosed for purpose of illustration, it will be evident that various changes and modifications may be made therein without departing from the scope and spirit of the invention.

I claim:

1. In the process for production of chloroprene from 1,2,3-trichlorobutane involving dehydrochlorinating 1,2,3-trichlorobutane to produce a mixture of chloroprene convertible dichlorobutenes, and subjecting said mixture of dichlorobutenes to non-catalytic thermal dehydrochlorination at temperature within the range of 450° C.–650° C. to produce chloroprene; the step of subjecting 1,2,3-trichlorobutane at a temperature within the range of 100° C. to 250° C. and under oxygen free conditions to the action of sodium hydroxide as dehydrochlorinating agent to produce a mixture of chloroprene convertible dichlorobutenes in which 2,3-dichlorobutene-1 is the major component.

2. The method of claim 1 in which the dehydrochlorination of 1,2,3-trichlorobutane with sodium hydroxide is carried out at a temperature between about 150° C. to 180° C.

References Cited by the Examiner

UNITED STATES PATENTS

| 2,524,383 | 10/50 | Hearne et al. | 260—655 |
| 2,879,311 | 3/59 | Hawkins | 260—654 |

OTHER REFERENCES

Tishenko: J. Gen. Chem. (U.S.S.R.), vol. 6, pp. 1553–8 (1936).

LEON ZITVER, *Primary Examiner.*

ALPHONSO D. SULLIVAN, DANIEL D. HORWITZ,
*Examiners.*